United States Patent [19]
Baermann

[11] 3,791,309
[45] Feb. 12, 1974

[54] MEANS TO GUIDE AND SUSPEND A VEHICLE BY MAGNETIC FORCES

[76] Inventor: Max Baermann, 506 Bensberg, Germany

[22] Filed: Sept. 17, 1971

[21] Appl. No.: 181,523

[30] Foreign Application Priority Data
Jan. 19, 1971   Germany............................ 2100839

[52] U.S. Cl. .......................... 104/148 MS, 335/306
[51] Int. Cl............................................. B61b 13/08
[58] Field of Search... 104/148 LM, 148 MS, 23 FS, 104/121; 335/306, 304, 302; 180/98

[56] References Cited
UNITED STATES PATENTS

| 3,158,765 | 11/1964 | Polgreen...................... 104/148 LM |
| 1,020,943 | 3/1912 | Bachelet...................... 104/148 LM |
| 845,459 | 2/1907 | Gilstrap.......................... 104/121 X |
| 3,365,599 | 1/1968 | Brzezinski et al................ 335/304 X |

FOREIGN PATENTS OR APPLICATIONS
| 643,316 | 4/1937 | Germany...................... 104/148 MS |
| 707,032 | 5/1941 | Germany...................... 104/148 MS |

Primary Examiner—Gerald M. Forlenza
Assistant Examiner—George H. Libman
Attorney, Agent, or Firm—Meyer, Tilberry & Body

[57] ABSTRACT

The invention relates to a structure to guide and support a vehicle by magnetic forces which utilizes the repulsive properties of permanent magnets attached to the vehicle and to the support in such a way that like poles are facing each other, which poles extend in the direction of motion, and are of alternating polarity transversely to the direction of motion. The relationship of the permanent magnets to achieve optimum suspension without generation of eddy currents and hysteresis losses is important. Further, the invention achieves lateral stability of the vehicle utilizing partial permanent magnetic forces and partial electromagnetic forces. The amount of vehicle support by the permanent magnets is mechanically controllable to compensate for environmental factors.

17 Claims, 7 Drawing Figures

PATENTED FEB 12 1974 3,791,309

MEANS TO GUIDE AND SUSPEND A VEHICLE BY MAGNETIC FORCES

This invention relates to the art of tracked vehicles and more particularly to an arrangement for supporting vehicles relative to a track by means of magnetic forces. Heretofore, it has been known that there have been extensive endeavors to further develop land vehicles for passenger and/or freight transportation in a way that makes them more competitive in terms of time with aircraft. These endeavors can only be successful if it is possible to create such land vehicles with higher safety, more luxury, independence from weather conditions, and higher operating speeds with reduced noise. These conditions can be achieved economically with the floating suspension of vehicles by magnetic or inductive forces.

Further, it has also been known to suspend vehicles such as trains along a supporting line or track by means of air cushions. In this situation, normally the supporting line or track is carried by stanchions at a certain height above the ground. The track and stanchions normally are made from reinforced concrete. The floating effect produced by the air cushions acts between the track and the base of the vehicle. Vehicles supported by this technique are of relatively low stability as it is difficult to obtain effective lateral stabilization. Moreover, because of the large motors necessary to provide sufficient air for the cushion effect, a high noise level is usually present.

Further, it has been known to support a vehicle along a track where the track is made from a magnetically attracted material. Here, the vehicle has electromagnets mounted thereon, and the vehicle is suspended with respect to the track by utilizing the attractive forces between the electromagnets and the track. Some means are provided to maintain an intermediate air gap between the electromagnets and the track, such as rollers, guides, or the like. However, in this type of magnetic suspension vehicle, a relatively high amount of energy is necessary to energize the magnets in order to achieve the strong magnetic attractive forces necessary. Further, the air gap must be maintained nearly constant which requires complicated and expensive control features and guides. The fabrication of such control features and guides is necessarily expensive, and this type of suspension is also subject to the generation of eddy currents and hysteresis losses which further increase the operating costs as well as the fabrication costs to reduce these losses.

The use of super-conductive magnets for the suspension of vehicles has also been studied. This technique, however, involves the major problem of maintaining the super-conductivity on the total track at the low temperatures required for super-conductivity. Therefore, complicated insulation techniques are necessary which raise severe technical problems and greatly increased costs.

Further, it has been known to utilize a conveyor device to transport small objects by a moving electromagnetic field associated with the conveyor to eliminate the friction between the vehicle and the conveyor. The field produced by such electromagnets acts to hold the objects in a suspended condition while moving.

In another type of electromagnetic-suspended vehicle, the electromagnets are mounted on the base or bottom of the vehicle. Other electromagnets are mounted on the track or rails or to the ties between rails. The magnets of the vehicle as well as the magnets mounted to the rails or ties are energized so that their pole surfaces are similar and they repel, thus holding the vehicle in suspension. In this prior art embodiment, a guiding rail is provided adjacent the lateral surfaces of the vehicle, which rails cooperate with rolls or simply slide with respect to the vehicle to maintain its lateral position while it is moving. In this totally electromagnetic approach, it is necessary to utilize extremely high amounts of electrical energy to provide the energization desired.

Therefore, it is the general purpose of the present invention to avoid the foregoing and other objections and limitations of the prior art by passing the suspension of the vehicle on the repulsive forces of permanent magnets. However, it is also well known that repulsing permanent magnets are in unstable lateral equilibrium. Thus, a magnetic suspension by means of permanent magnets is only possible if the freedom of movement is limited in the lateral plane.

In magnetically suspended bearings for a rotating shaft, for example, which utilizes permanent magnetic discs arranged in repulsing relationship having an intermediate air gap, the shaft must be held against lateral displacement to, in effect, obtain a bearing without any friction. In this example, the lateral guiding of the shaft can be done by mechanical or electromagnetic means whereby the electromagnetic control can be done, for example, by changing the inductivity of appropriately positioned coils directly dependnet on the lateral displacement of the shaft.

For purposes of test and demonstration, a small vehicle has been built which is suspended by permanent magnets attached to its bottom above a magnetic track which has also been composed of permanent magnets in a way that like poles are facing each other. This vehicle has been secured against lateral displacement by means of rolls facing a central guiding rail. During the movement of the vehicle, such rolls slide or roll along the lateral walls of the guiding rail thus holding the vehicle in lateral alignment exactly above the track. Even with the friction of the rolls, this small vehicle has worked extremely well.

Hence, it is another purpose of the present invention to provide a technically feasible and economical suspension of vehicles, and more particularly trains, to serve for transporting passengers or freight along a track by exploiting the repulsive forces of permanent magnets and to provide a stable lateral guidance of the vehicle while avoiding a touching of the vehicle in any manner with the track. This will enable trains to carry large loads with a very limited amount of horizontal thrust being required while maintaining a lateral stability of the train.

I have found that the horizontal thrust can be maintained at a minimum if the space between the north and south poles of the supporting magnets is maintained with predetermined critical limits so that maximum pole surface for producing the supporting force can be attained.

According to a preferred embodiment of my invention, the pole distance between the poles of the permanent magnets attached to the vehicle and the track extending in the direction of motion is at least twice the distance of the controlled lateral displacement allowed for the vehicle. Further, I have provided a stabilizing means arranged on the vehicle and the track with these means being actuated electromagnetically and automatically controlled by appropriate control members, scanning elements, or the like where actuation is either by means of induction, some electronic scanning, or similar means.

Utilizing these principles according to my preferred embodiment of the invention, I have found it possible to attain lateral stabilization of the vehicle about a preferred central position by such electromagnetic controls using a relatively small amount of electrical energy whereby extremely high supporting forces for the vehicle may be achieved by means of permanent magnets. Utilizing the permanent magnetic supporting principles of my invention, I have found that I will be able to attain supporting forces of more than 0.5 tons per square meter of magnetic area with a suspension height or air gap of between 8 to 10 millimeters.

In the preferred embodiment, the permanent magnets are arranged on the track and on each side of the vehicle in such a way that there is an uneven number of poles, however, with at least three poles extending in the direction of motion having alternate polarity transversely to the direction of motion. In such an arrangement, both the lateral side poles are similar; i.e., either north or south poles. In this arrangement, I have found that it is preferable that the width of the laterally outside poles is about half the width of the inside poles, since this will achieve the least amount of stray magnetic losses.

In order to minimize the tilting moment and obtain the most stable horizontal position possible of the vehicle, I have disposed the permanent magnets adjacent the sides of the vehicle so that they are as far as possible away from the central longitudinal axis of the vehicle.

In another adaptation of the embodiment positioning the permanent magnets on the longitudinal sides of the vehicle as far as possible from the central longitudinal axis of the vehicle, the supporting track or line is provided with permanent magnets subdivided into several lines arranged one above the other, in order to increase the supporting force on one hand, and to achieve a more stable equilibrium position on the other. In this embodiment, suitable supporting stanchions include two or more laterally extending supporting arms disposed one above the other actually define the track to which the permanent magnets are attached. In this embodiment, the vehicles includes arms of corresponding shape forming a surface parallel to the lateral supporting arms to which counter-magnets are attached. The two supporting arms are arranged one above another on either side of the supporting stanchions, and are covered so that they are protected against influences of weather conditions such as snow and ice, as well as against dirt. It is advantageous to provide the covers, or if there are none, the supporting arms themselves with heating means preventing the formation of ice.

A further object of the invention is to increase the supporting forces, or to achieve similar supporting forces to the prior art with smaller amounts of magnetic material. This is achieved by having the permanent magnets arranged on supporting members of ferromagnetic material which passes the magnetic flux of the permanent magnets to adjacent magnets. These ferromagnetic surface members are fastened to the supporting track which makes for an economical mounting, if the supporting track is made from reinforced concrete, for example. Similarly, the permanent magnets mounted on the bottom of the vehicle are provided with a ferromagnetic material backing and arranged in such a way that they are facing the permanent magnets attached to the track with like poles in opposed relationship.

A further object of the invention is to provide an increase in the supporting forces by positioning additional magnets magnetized transversely to the direction of motion between the supporting permanent magnets in a way that like poles of the additional magnets are adjacent the like poles of the supporting magnets extending in the direction of motion. Preferably also, the additional magnets have a higher coercive force than the supporting permanent magnets. This technique with the additional magnets reduces magnetic stray losses to a minimum.

A further object of the invention is to maintain the air gap between the magnets attached to the vehicle and to the track uniform and independent of the vehicle load. This is accomplished by making some of the permanent magnets mounted to the vehicle movable in a vertical direction to the plane of the track which can be adjusted in height and according to the load of the vehicle automatically be properly positioned to maintain a uniform air gap. Suitable induction or mechanical means such as a hydraulically operated cylinder can accomplish this purpose.

A further object of the invention is to make the permanent magnets from a sintered permanent magnet material, although permanent magnetic powder and a binder can also be used advantageously. In the case of the magnetic powder and binder, even though the volume of the effective permanent magnetic material is reduced by the binder, I have found that quite a favorable and sufficient supporting force can be achieved with this type of permanent magnet.

A further object of the invention is to utilize permanent magnetic material of high coercive force, as for example, anisotropic strontium ferrite, barium ferrite, or manganese aluminum. Typical binders would include thermoplastic as well as thermosetting synthetic materials or rubber, as typical examples, although the invention clearly is not limited to these preferable permanent magnetic materials and binders.

A further object of the invention is to make the track and supporting stanchions from reinforced concrete, and to embed powdered permanent magnetic materials directly into the concrete to form the track permanent magnetic supporting structure. In this type of embodiment, the mixture of binder and anisotropic permanent magnetic material can be aligned by mechanical or magnetic means while the binder hardens so that the preferred axes of magnetizatization of the permanent magnetic particles extend vertically to the plane of the supporting track in the case of the supporting magnets and transversely to the direction of motion of the vehicle in the case of additional magnets utilized for lateral support.

A further object of the invention is to provide a lateral stabilization of the vehicle without utilizing guiding rolls or central guiding rail so that the vehicle will be able to achieve maximum speeds. I achieve this by providing rails extending in the direction of motion made of ferromagnetic laminated material, which are faced by electro-magnetic systems and self-induction coils attached to the vehicle so that the energizing current of the electromagnets is controlled by the self-induction coils in case of lateral displacement to maintain the central position of the vehicle. With this design, it is possible to electrically register the lateral displacement of the vehicle by means of a bridge connection of the self-induction coils, and bring the vehicle back again to the central position by electronic control members due to the control of the attraction forces of the lateral electromagnetic systems on either side.

A further object of the invention is to provide a magnetically-suspended vehicle which is held in accurate lateral displacement with respect to a supporting track, and which may be driven by a known means, such as for example, linear motors or turbines driving through a conventional wheel system, or which might be powered by a jet-type principle utilizing some type of gas as fuel, or even by an air drive operating in the manner of a jet.

The aforesaid objects of the invention and other objects which will become apparent as the description proceeds are achieved by providing a vehicle guided and supported by magnetic repulsion forces along a supporting track utilizing the repulsive forces of highly coercive permanent magnets attached to both the vehicle and the supporting track in a way that like poles are facing each other, which poles extend in the direction of motion and are of alternating polarity transversely to the direction of motion, characterized in that the pole distance between two poles of the permanent magnets attached to the vehicle and the supporting line extending in the direction of motion and having opposite polarity are preferably at least double the size of the allowable lateral movement for the vehicle, and which include electromagnetically-controlled means to stabilize the vehicle transversely to the direction of motion, said electromagnetic means being controlled by sensing the lateral position of the vehicle with respect to a central longitudinal axis, and controlling the energization of the electromagnets to maintain the vehicle in predetermined relation with respect to the central longitudinal axis thereof.

The invention may take physical form in certain parts and arrangement of parts, preferred embodiments of which will be described hereinafter and illustrated in the accompanying drawings which are a part hereof, wherein.

Figure 1:
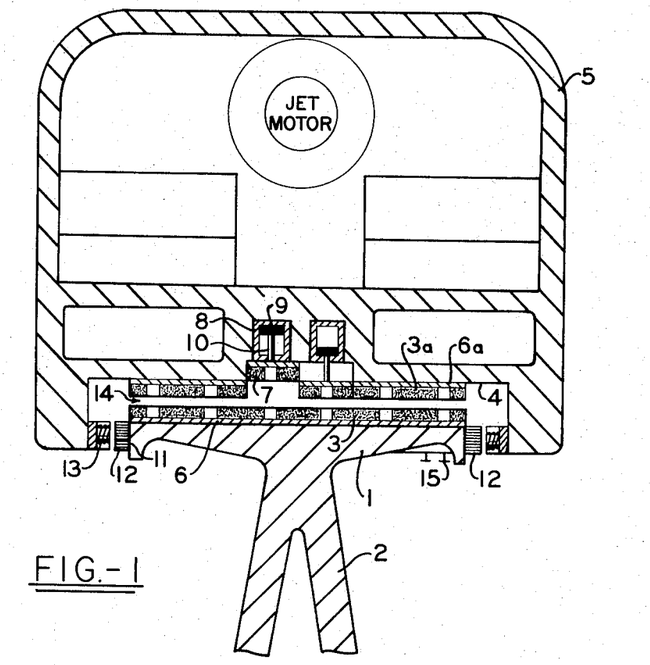
FIG. 1 is a diagrammatic longitudinal section through a vertical suspended above a supporting track.

Referring now to the drawings where the showings are for the purpose of illustrating preferred embodiments of the invention and not for the purpose of limiting same, in FIG. 1, an elongated supporting track 1 is held at a certain height above the ground by means of suitable supporting stanchions 2. The supporting track 1 and stanchions 2 form a unit which might be integrally formed together, for example, of reinforced concrete. The entire surface of the supporting track 1 has been covered with a plurality of longitudinally extending supporting permanent magnets indicated generally by numeral 3. In order to limit stray magnetic losses, the permanent magnets 3 are fastened to an underlying ferromagnetic sheet 6 which serves to concentrate the lines of magnetic force. A vehicle 5 has a bottom 4 with longitudinally extending stationary permanent magnets 3a similarly attached to a ferromagnetic sheet 6a mounted to the bottom 4. The permanent magnets 3 and 3a mounted on the supporting track and on the vehicle, respectively, are magnetized in a way that like poles are facing each other, as is clearly shown in FIG. 1, and which poles extend in the direction of motion of the vehicle, or into or out of the page as illustrated, and are of alternating polarity transversely to the direction of motion. Hence, in the embodiment illustrated, the poles on the lateral outside edges are north, and then the poles alternate south-north to the central south pole extending longitudinally substantially in alignment with the central axis of the track 1. The permanent magnets 3 and 3a facing each other with like polarity produce repulsive forces holding the vehicle 5 in suspension.

In order to maintain an air gap 14 between the permanent magnets 3 and 3a facing each other under changes in the actual load of vehicle 5, I provide a plurality of permanent magnets 7 positioned on the bottom side 4 of vehicle 5. In case of increasing or uneven load, the movable magnets 7 are lifted or lowered in order to balance the height between the vehicle 5 and the track 1 so as to maintain a substantially constant or predetermined air gap 14. In the embodiment of the invention illustrated in FIG. 1, the movable magnets 7 are lifted and lowered hydraulically by means of appropriate cylinders 8 in which a piston 9 lowers the magnets 7 through a piston rod 10 to which the magnets 7 are appropriately attached. In order not to confuse the drawing, hydraulic lines to cylinders 8 are not illustrated, but are naturally necessary to insure the operation of the pistons 9. It should be understood, however, that when hydraulic pressure is reduced, the lowered magnets will automatically return to their initial positions, or that position illustrated by the left-hand piston in FIG. 1 due to the existing repulsive forces between the magnets 3 and 3a. Suitable control elements, also not shown, may be provided to control the hydraulic pressure to the cylinders 8 so that according to a given vehicle load, the adjustment of the movable permanent magnets 7 is effected automatically to achieve a predetermined air gap relationship.

As stated previously, the vehicle 5 suspended only by the repulsive forces of the permanent magnets 3 and 3a is unstable in the lateral condition. Therefore, it is necessary to stabilize the vehicle 5 against lateral displacement. In order to achieve a lateral stabilization without any actual contact at the two lateral surfaces 11 of the supporting track 1, appropriate rails 12 extending in the direction of motion are provided which preferably are made of ferromagnetic laminated material, or in the embodiment illustrated in FIG. 1, a plurality of sheets piled together of mutually isolated silicon iron. It should be understood, however, that other suitable ferromagnetic material could also suitably meet the objects of the invention, although I have found that this laminated structure provides great attractive power for small size and cost.

Cooperating with the ferromagnetic rails 12 are electromagnets 13 mounted to the bottom lateral edges of the vehicle 5 in adjacent spaced relation thereto as clearly illustrated in FIG. 1.

Lateral stability for vehicle 5 is thus achieved by appropriate control of the energization of electromagnets 13. In operation in case the vehicle 5 shifts laterally to the left side as viewed in FIG. 1, the electromagnet 13 on the left side will be energized more strongly tending to pull the vehicle 5 back towards the right or to the central position. Any appropriate controls to effect the proper energization of the appropriate electromagnets on either side can be utilized, and these are quite well-known and understood by those skilled in the art. However, further description relating to appropriate controls will be more fully discussed hereinafter.

In order to supply electric current to the vehicle 5 from below the track 1, appropriate conductor rails or contact wires 15 are provided. This position is of special advantage, because the conductors are protected against the influence of weather.

Figure 2:
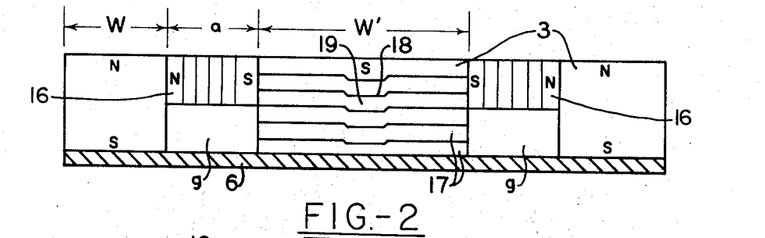
FIG. 2 is a vertical section through the permanent magnetic arrangement transverse to the direction of motion.

Now, with respect to the specific arrangement of permanent magnets, reference should be made to FIG. 2 of the drawings which illustrates the permanent magnet arrangement of the supporting track in vertical cross section. The supporting permanent magnets 3 are magnetized vertically to the plane of the supporting track and fastened to the sheets 6 of ferromagnetic material in any appropriate manner, such ad adhesively or mechanically. The poles of the magnets 3 as vertically magnetized are marked by the letters N and S.

As can clearly be seen from FIG. 2, the pole width W of the laterally outside permanent magnets 3 is substantially about half the pole width W' of the interior permanent magnets. Further, it should be understood that while FIG. 2 only shows 1 interior magnet, it is quite clearly shown in FIG. 1 that any number of interior permanent magnets is contemplated by the invention, and particularly five interior magnets are illustrated in FIG. 1. I have found that in order to reduce stray magnetic forces on the lateral outside edges of both the track and the vehicle to a minimum, the laterally outside magnets are always of like polarity, although this is not necessary or critical to achieve the objects of the invention. This means that as illustrated in FIG. 1, an uneven number of magnets will preferably be present in both the supporting magnet surfaces.

As a further important structural feature of the permanent magnetic association, the distance between permanent magnets 3, hereinafter referred to as pole distance a, and which pole distance refers to the distance between two permanent magnets whether they are attached to the vehicle or the supporting track, and which extend in the direction of motion of the vehicle and having opposing polarity, is at least twice the distance of the predetermined allowable lateral movement for the vehicle. Hence, as an example, in case of an allowable lateral maximum movement of ±5 millimeter, the pole distance a should be at least about 20 millimeters.

As a further structural feature of the invention, additional magnets 16 are positioned between the supporting permanent magnets 3 which are magnetized transversely to the direction of motion in a way that like poles of the additional magnets are always adjacent to like poles of the supporting magnets as can be seen from the letters N and S shown in FIG. 2. In order that the like pole relationship is properly achieved, the pole width of the additional magnets 16 is about half the height of the supporting permanent magnets 3. In other words, a gap g does exist beneath each of the additional magnets 16 to achieve this structural dimensional relationship. This design between magnets 16 and 3 provides a further increase in the supporting force possible because the magnetic leakage between neighboring poles of opposite polarity of the supporting magnets is thus considerably reduced.

It is a feature of the invention that the permanent magnets 3 as well as the additional magnets 16 can be made of sintered permanent-magnetic material of the highest possible coercieve force. As a preferred construction, the permanent magnets 3 consist of a mixture of a thermoplastic binder and powdered highly coercive anisotropic strontium ferrite. Other permanent magnetic materials which might be utilized also, include anisotropic barium ferrite or manganese aluminum. Any other suitable magnetic material having the highest possible coercieve force will meet the objects of the invention because such high coercive force materials are not subject to de-magnetization when like poles oppose each other.

Since it is difficult to produce plastic-bound permanent magnets of great thickness, the magnets are preferably composed of several thin tapes 17, as illustrated in FIG. 2. Further, in order that the individual magnetic tapes align themselves automatically when they are laid up to the form illustrated in FIG. 2, eadh magnetic tape is provided with a boss 18 and a recess 19 which serve to achieve the desired centering alignment.

Figure 3:
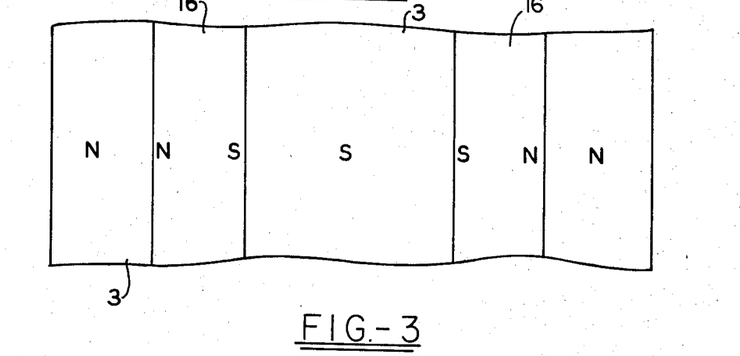
FIG. 3 is a plan view of the permanent magnet arrangement of FIG. 2.

It is a preferred feature of the invention that the additional magnets 16 are made of a magnetic material having a higher coercive force than the supporting magnets 3. As defined above, the supporting magnets 3 have been magnetized so that the axes of magnetization extended vertically to the plane of the supporting track, while the axes of magnetization of the additional magnets 16 extend transversely to the direction of motion of the vehicle 5. FIG. 3 very clearly illustrates the pole magnetization relationship of the permanent magnets 3 and the additional magnets 16, and the fact that all these magnets extend longitudinally with respect to the track in the direction of motion of the vehicle.

Figure 4:
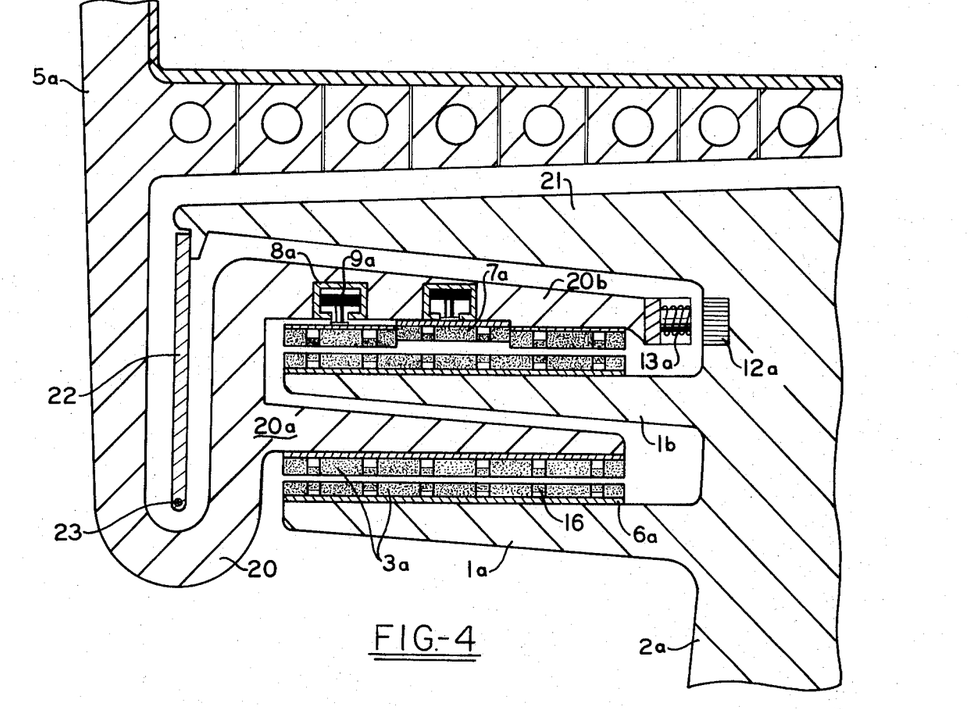
FIG. 4 is a vertical section partially broken away of a modified track arrangement to shield the supporting magnets from the weather, dirt, etc.

Another embodiment of the invention is shown in enlarged relationship in FIG. 4, and similar components to the embodiment of FIG. 1 are illustrated with the same numeral with the suffix a added. Here, the supporting stanchions 2a include two supporting tracks 1a and 1b, arranged above each other, each of which has been covered with permanent magnets according to the permanent magnet arrangement shown and described in FIG. 2. The vehicle 5a has arms 20 of corresponding design which on their surface 21 facing the supporting tracks 1a and 1b are also provided with permanent magnets of the same pole arrangement. It should be understood that only one side of the track is illustrated in FIG. 4, but that a similar track arrangement will be present on the opposite side of the stanchion 2a.

In addition to the stationary permanent magnets, as described already in FIGS. 1 and 2, there are movably-arranged permanent magnets 7a, adapted to be adjusted in vertical height to control the air-gap relationship between the permanent magnets of the vehicle and the supporting track. The magnets 7a can be hydraulically lowered by the pistons 9a situated in cylinders 8a. In FIG. 4, as illustrated, the left magnet system is lowered, while the right is in the upward position, normally being maintained there by the repulsive forces between the magnets. The supporting tracks 1a and 1b are protected against the influences of weather or dirt by a horizontal cover 21. At the exterior ends of cover 21, there is a lateral lining 22 provided with a heating element 23 for preventing the formation of ice. The lateral lining 22 can be made of plastic material or aluminum, as typical examples.

In order to provide lateral stabilization without any frictional engagement in this embodiment of the invention, rails 12a extending in the direction of motion and made of ferromagnetic laminated material are attached to the supporting stanchion 2a which rails 12a are faced by electromagnets 13a fastened to the ends of the arm 20b, as shown in the illustrated example, although they might easily also be cooperative with the arm 20a.

In order to effect operation of the lateral stabilization system between the ferromagnetic material 12a and the electromagnets 13a, there are scanning means electrically registering a lateral displacement of the vehicles such as, for example, self-induction coils disposed in a balanced bridge connection. The self-induction coils are fastened to the vehicle between the electromagnets 13a, and cooperate with the same ferromagnetic rail 12.

Figure 7:
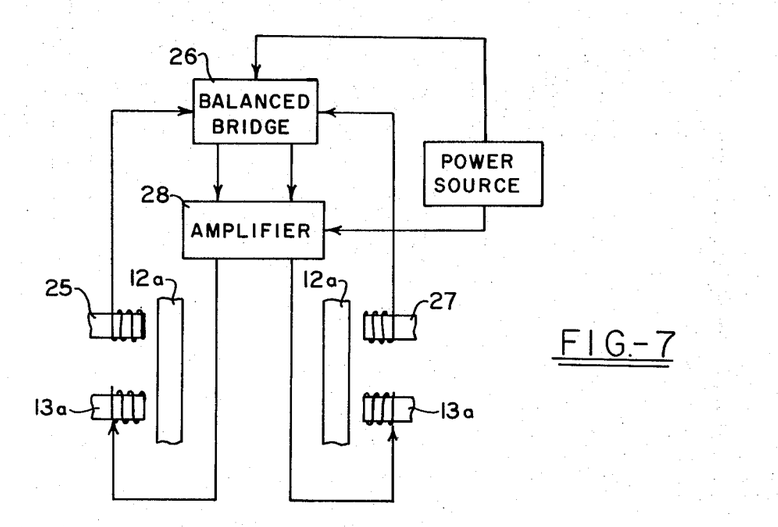

A balanced-bridge relationship between the induction coils is illustrated in FIG. 7 of the drawings, and it is quite obvious from the schematic that when the vehicle is laterally displaced to the right side, the coil 25 will have an increased inductance because of its closer proximity to the ferromagnetic rail 12, and unbalance the bridge 26 and upon the unbalancing the bridge 26, the electromagnet 13a associated with the opposite side from the induction coil 25 will be more strongly energized so as to move the vehicle back to the central position. The bridge 26 is further unbalanced because the induction in coil 27 on the right-hand side is clearly less inductive because of its further proximity from its respective ferromagnetic rail 12a. Hence, it is seen that by use of the balanced bridge in cooperation with the self-induction coils 25 and 27, a control member sensitive to distortion of phase influences the amplifier 28 in such a way that the energizing current of the appropriate electromagnet which is further away from the ferromagnetic rail is intensified as in the energizing current of the other magnet is weakened, so that vehicle 5 is again drawn back into the central position. In this way, a continuous automatic lateral stabilization is achieved without any frictional engagement of any parts.

A similar typical lateral stabilizing system would be that described in the article in Philips' Techaische Rundschau, entitled "Ein Magnetisches Lager" by F. Th. Backers, 1960/61, Nt. 7, and particularly the system shown in FIGS. 10, 11, and 12, and the descriptive part relative thereto.

Of course, it should be understood that other lateral stabilizing means based on the effect of repulsive forces can be used, rather than attractive forces as is described to still achieve the desired lateral stabilizing characteristics of the invention. Further, as control members, inductive coils are not necessary, but suitable mechanical or optical sensing means could be provided which electronically affect the control of the lateral stabilizing means.

Figure 5:
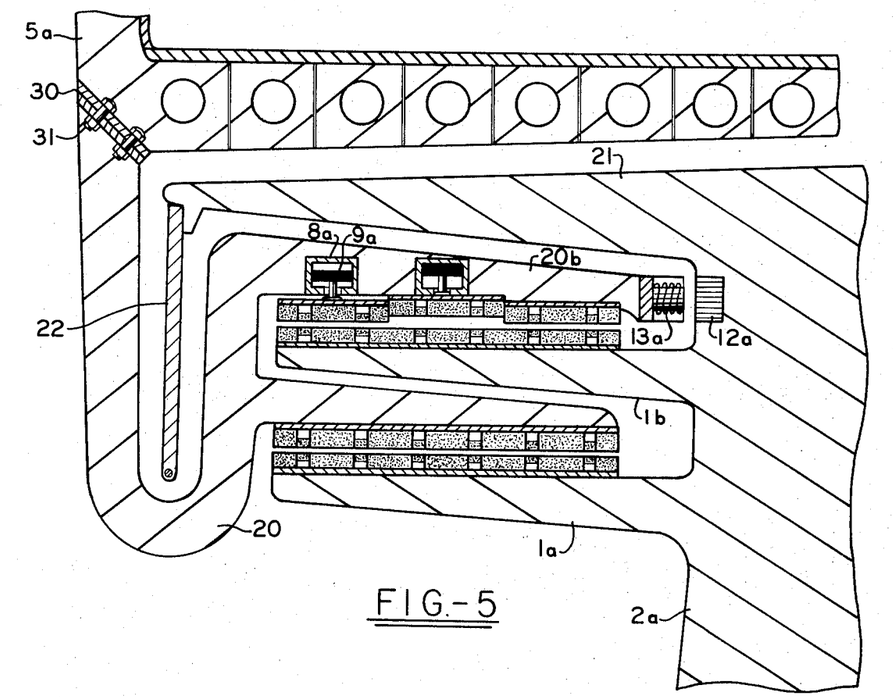
FIG. 5 is a vertical section partially broken away similar to FIG. 4, except showing a modification where the supporting arm for the vehicle is separately mounted rather then being integrally formed with the vehicle.

Now, with respect to the modified embodiment of the invention illustrated in FIG. 5, the only difference to that embodiment shown in FIG. 4 is that the arm 20 is actually a separate member, mechanically or otherwise suitably attached to the vehicle 5. In the example illustrated, a flange 30 with appropriate bolts 31 is utilized to make the mechanical attachment of the arm 20 to the vehicle 5. This construction greatly simplifies the fabrication of the arm with respect to the vehicle, and will be a less expensive embodiment to implement with the vehicle.

Figure 6:
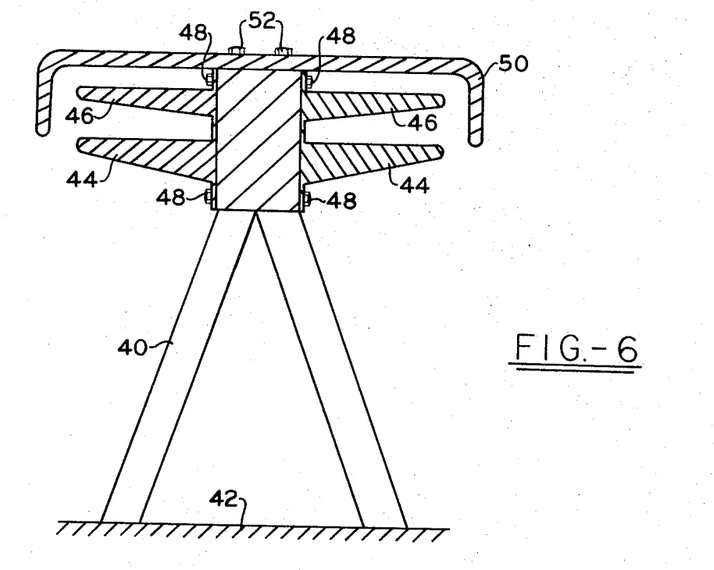
FIG. 6 is a vertical section of a modified track configuration illustrating the supporting arms and the cover shield as separately attached components rather than being integrally formed as illustrated in the embodiment of FIG. 4; and, FIG. 7 is a schematic diagram of a typical circuit that might be used for achieving lateral stability.

FIG. 6 illustrates a modified embodiment of the supporting stanchion and track. It should be understood that even though the other embodiments of the invention illustrate the supporting stanchion and track as being made from reinforced concrete, it should be understood that these tracks can also be made of steel construction with the horizontal cover protecting the support tracks against the influence of weather and dirt.

FIG. 6 illustrates the construction of FIG. 4 with separate components appropriately affixed to each other to form the completed unit. In FIG. 6, the supporting stanchions 40 are illustrated as being mounted to the ground 42. The lateral supporting tracks 44 and 46 are separately mounted to the stanchion 40, again by appropriate mechanical means such as bolts, indicated generally by numeral 48. Similarly, the cover 50 could be of separate construction and mounted to the top of stanchion 40 again by appropriate means such as bolts 52.

Hence, it is seen that the objects of the invention are achieved by utilizing permanent magnets to provide a magnetic suspension of a vehicle with respect to a track, and utilizing electromagnets and appropriate attraction rails or strips to achieve the necessary lateral stability to the vehicle during its movement with respect to the track. The ability to control the air gap and hence the suspension of the vehicle by appropriate vertical control of some of the suspension permanent magnets, as well as the control of the lateral displacement gives great flexibility to this system which completely eliminates friction with respect to the movement of the vehicle relative to the track. The only actual friction necessary would be through some appropriate drive wheels, and the amount of friction and weight bearing required to the drive wheels would be extremely small because of the greatly lessened drictional characteristics of the vehicle as a whole with respect to its track. Hence, extremely small forces could provide the desired propulsion to the vehicle, as in essence only wind resistance would have to be overcome. Perhaps a jet engine such as shown in FIG. 1, or an air-driven turbine to provide a thrust force would accomplish the driving principles for the vehicle better than a normal wheel friction engaging drive. A linear motor operating the same as a three-phase motor, but flattened out could also be used to effect the drive. It is also possible of course that some other external forces contacting the vehicle and giving it an impulse force until another contact and impulse is provided would be suitable to the objects of the invention. This would perhaps be most appropriate where a passenger vehicle were not involved, but rather a vehicle for transporting goods.

One other important aspect of the invention is that the suspension or supporting magnets be preferably positioned as far laterally to each side of the vehicle as possible. To this end, it is preferable to stack the magnets in vertical rows as shown in FIGS. 4 and 5, but where more than two stacked rows would be utilized. This lessens the width of the magnets necessary on the track and the vehicle, thereby reducing fabrication costs, and mounting costs. In addition, it greatly improves the overall transverse stability of the vehicle.

It should further be understood that it is not necessary to accomplish the objects of the invention to have an odd number of poles across the lateral width of the vehicle; i.e., an even number would work, but the odd number is preferable to reduce stray field losses.

It should further be understood that the adjustable magnets 7 in FIG. 1 and 7a in FIG. 4 can be utilized to maintain transverse balance to the vehicle, as well as to maintain a predetermined air gap regardless of load. In other words, in a passenger train, persons would move from side to side in the train and transverse stability would be maintained by proper adjustment to laterally positioned vertically-adjustable magnets. Preferably between about 25 to 50 percent of the magnets would be vertically movable with these positioned mostly toward the lateral sides of the vehicle. They would preferably move between 5 mm to 10 mm.

Therefore, in accordance with the patent statutes, only the preferred embodiments of the invention have been illustrated and described in detail, but it is to be particularly understood that the invention is not limited thereto or thereby, but that the invention scope is defined in the appended claims.

What is claimed is:

1. A system for guiding and suspending a vehicle relative to supporting track means by magnetic forces, said system including a plurality of highly coercive vehicle permanent magnets attached to said vehicle, a plurality of highly coercive track permanent magnets attached to said track means, said vehicle permanent magnets and track permanent magnets having like magnetic poles facing one another across an air gap, said permanent magnets being in spaced-apart rows extending substantially parallel to the direction of motion of said vehicle, said rows being of alternating polarity transversely to the direction of motion of said vehicle, electromagnetic means for stabilizing said vehicle transversely to its direction of motion, control means for controlling said electromagnetic means to maintain said vehicle in a predetermined central position transversely to its direction of motion, said track means being supported by stanchions and including at least two pairs of supporting tracks spaced-apart transversely to the direction of motion of said vehicle, each said pair of supporting tracks including vertically spaced supporting tracks, said vehicle having a centerline, at least two pairs of arms attached to said vehicle in spaced-apart relationship on opposite sides of said vehicle centerline, each said pair of arms including vertically spaced arms for cooperation with said vertically spaced tracks, said vehicle magnets being on all said arms and said track magnets being on all said tracks, said supporting tracks having outer ends, and covering elements over said outer ends for protecting said tracks.

2. The device of claim 1 wherein said permanent magnets are positioned on surface members of ferromagnetic material for concentrating the magnetic flux, said surface members being fastened to said tracks and arms.

3. The device of claim 2 and further including additional permanent magnets positioned between said rows, said additional permanent magnets being magnetized transversely to the direction of motion of said vehicle and having like poles thereon facing like poles on said magnets in said rows, said additional magnets having a higher coercivity than said vehicle and track permanent magnets.

4. The device of claim 3 wherein at least certain of said vehicle magnets are movable substantially vertically, and adjustment means for adjusting the vertical position of said movable vehicle magnets to vary the air gap between said movable vehicle magnets and certain of said track magnets.

5. The device of claim 4 wherein said covering elements for said outer ends of said tracks include heating means.

6. The device of claim 3 wherein all of said permanent magnets are formed from permanent magnet powder particles of high coercive force from the class including anisotropic strontium ferrite, barium ferrite and manganese aluminum, said magnet powder particles being mixed with a binder, said magnet powder particles in said track and vehicle magnets being mechanically or magnetically aligned substantially vertically, and said magnet powder particles in said additional magnets being mechanically or magnetically aligned substantially perpendicular to the alignment direction of said particles in said track and vehicle magnets and transversely to the direction of motion of said vehicle.

7. The device of claim 6 wherein said binder comprises a thermoplastic synthetic material.

8. The device of claim 6 wherein said binder comprises a thermosetting synthetic material.

9. The device of claim 6 wherein said binder comprises a rubber material.

10. A vehicle guided and suspended by magnetic forces along a supporting track which comprises a plurality of highly coercive permanent magnets attached to both the vehicle and the supporting track in such a way that like poles are in a substantially horizontal relation and are facing each other, which poles extend in the direction of motion and are of alternating polarity transversely to the direction of motion, electromagnetic means mounted to the vehicle for stabilizing the vehicle transversely to the direction of motion, ferromagnetic material mounted to a substantially vertical surface of the track in face-to-face cooperation with the electro-magnetic means, control means cooperatively controlling the electromagnetic means to maintain the vehicle at a predetermined central position during its movement longitudinally of the track, there being an odd number of permanent magnetic poles extending in the direction of motion having alternating polarity transversely to the direction of motion, where the laterally outside magnets are of the same polarity, where the width ($W'$) of the center permanent magnet is at least twice the width (W) of the laterally outside magnets, and the space (a) between adjacent magnets is at least twice the allowable lateral movement of the vehicle, said magnets including sufficient permanent magnets to maintain an air gap of between 8 to 10 m.m. between the rails and the vehicle, where at least between about 25 percent to 50 percent of the permanent magnets on the vehicle are movable in a vertical direction relative to the plane of the supporting track, and means to adjust the vertical position of the movable magnets to control the air gap between the non-movable permanent magnets on the vehicle and the permanent magnets on the supporting track.

11. A magnetic levitation system for guiding and suspending a vehicle relative to a supporting track by magnetic forces, said system including a plurality of spaced-apart elongated rows of permanent magnets extending in a predetermined direction and having outer pole faces facing a plane, said pole faces being of alternating polarity transverse to said predetermined direction and parallel to said plane, additional permanent magnets positioned between said rows and being magnetized transversely to said predetermined direction and substantially parallel to said plane to have opposite pole faces facing said magnets in said rows, said additional magnets having a thickness substantially one-half the thickness of said magnets in said rows and having outer surfaces lying substantially in a common plane with said outer pole faces, said additional magnets substantially filling the space between said rows, said pole faces on said additional magnets facing poles of like polarity on said magnets in said rows.

12. The magnetic levitation system of claim 11 wherein one of said systems is attached to a vehicle and another of said systems is attached to a track in opposed facing relationship to said one system across an air gap, said magnet rows in said systems having poles of like polarity facing one another.

13. The system of claim 12 and including lateral stabilizing means for limiting lateral movement of said vehicle relative to said track to a predetermined maximum lateral movement, said magnet rows being spaced-apart a distance at least as great as said maximum lateral movement.

14. The system of claim 13 wherein said magnet rows are spaced-apart a distance at least twice as great as said maximum lateral movement.

15. The system of claim 13 wherein said lateral stabilizing means comprises spaced-apart rails of ferromagnetic material attached to said track and spaced-apart electro-magnets attached to said vehicle, and control means on said vehicle for controlling energization of said electro-magnets to attract said electro-magnets toward said rails with variable force for maintaining said vehicle within a predetermined lateral position relative to said track.

16. A magnetic levitation system for guiding and suspending a vehicle relative to a supporting track by magnetic forces, said system including a plurality of spaced-apart elongated vehicle rows of vehicle permanent magnets extending parallel to the direction in which said vehicle moves, a plurality of spaced-apart elongated track rows of track permanent magnets extending parallel to the direction in which said vehicle moves, said rows having pole faces facing one another and a common plane across an air gap, said pole faces being of alternating polarity transverse to the direction in which said vehicle moves and parallel to said plane, like pole faces on said vehicle and track rows facing one another, magnetic lateral stabilizing means for limiting lateral movement of said vehicle relative to said track within a predetermined maximum lateral movement, said rows being spaced-apart a distance at least as great as said maximum lateral movement, at least certain of said vehicle rows of permanent magnets being movable toward and away from said track rows, and adjusting means for moving said movable magnets to vary the air gap between said movable magnets and certain of said track rows of track magnets.

17. A permanent magnet device including a plurality of spaced-apart permanent magnets having opposite north and south pole faces, alternate ones of said magnets being reversibly positioned so that said magnets present alternate north and south outer pole faces, said outer pole faces lying in a common plane, additional permanent magnets positioned between said permanent magnets and being magnetized substantially parallel to said plane, said additional permanent magnets having opposite pole faces facing said permanent magnets, said additional permanent magnets having a thickness not greater than one-half the thickness of said permanent magnets and having outer surfaces lying substantially in said plane, said additional permanent magnets substantially spanning the spaces between said permanent magnets, and said pole faces on said additional permanent magnets facing poles of like polarity on said permanent magnets.

* * * * *